United States Patent [19]
Hirasawa

[11] Patent Number: 5,436,684
[45] Date of Patent: Jul. 25, 1995

[54] PHOTOGRAPHING APPARATUS

[75] Inventor: Masahide Hirasawa, Sagamihara, Japan

[73] Assignee: Canon Kabushiki Kaisha, Tokyo, Japan

[21] Appl. No.: 107,460

[22] Filed: Aug. 17, 1993

Related U.S. Application Data

[63] Continuation of Ser. No. 926,598, Aug. 6, 1992, abandoned.

[30] Foreign Application Priority Data

Aug. 9, 1991 [JP] Japan .................................. 3-225133

[51] Int. Cl.⁶ .............................................. G03B 1/18
[52] U.S. Cl. ................................ 354/195.12; 354/400
[58] Field of Search ............................. 354/195.12, 400

[56] References Cited

U.S. PATENT DOCUMENTS

| | | | |
|---|---|---|---|
| 4,816,859 | 3/1989 | Maruyama et al. | 354/400 |
| 4,935,763 | 6/1990 | Itoh et al. | 354/195.12 |
| 5,075,709 | 12/1991 | Ueyama | 354/195.12 |
| 5,136,324 | 8/1992 | Tsubol et al. | 354/400 |
| 5,146,260 | 9/1992 | Yamamoto | 354/400 |
| 5,157,432 | 10/1992 | Fukuoka et al. | 354/195.12 |

*Primary Examiner*—Monroe H. Hayes
*Attorney, Agent, or Firm*—Robin, Blecker, Daley & Driscoll

[57] ABSTRACT

A photographing apparatus comprises a first lens group to variably change a magnification, a second lens group to perform a focus adjustment, a movement measuring sensor to measure a moving speed of the first lens group, a movement control circuit to move the second lens group at the moving speed according to a measurement value of the moving speed which is obtained from the movement measuring sensor and a speed change circuit to change the moving speed of the first lens group. The apparatus has a stop circuit for allowing the movement control circuit to stop the movement control of the second lens group according to the measurement value of the moving speed obtained from the movement measuring sensor when the moving speed derived from the movement measuring sensor is changed.

29 Claims, 6 Drawing Sheets

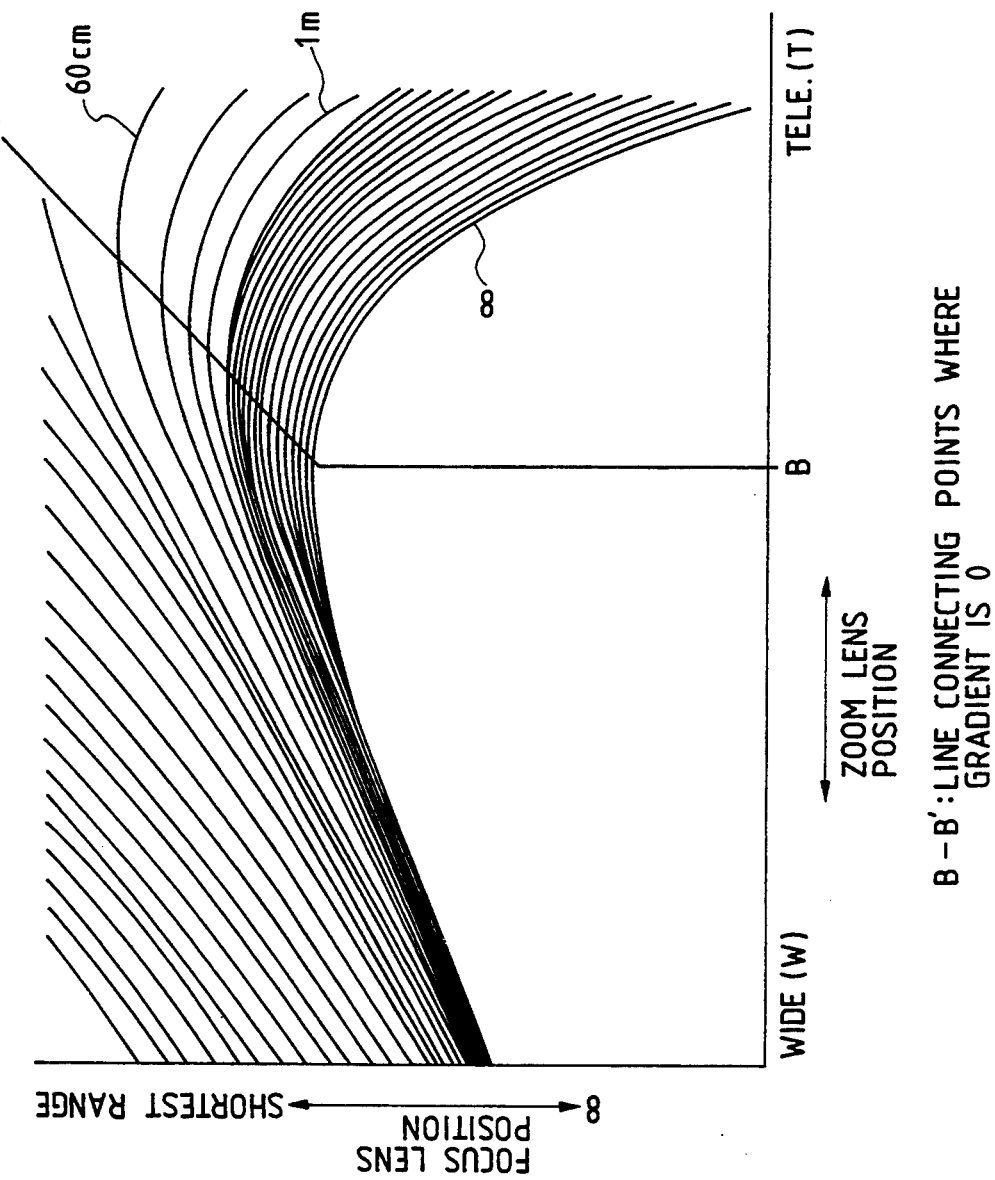

PHOTOGRAPHING APPARATUS

This is a continuation application under 37 CFR 1.62 of prior application Ser. No. 926,598, filed Aug. 6, 1992, now abandoned.

BACKGROUND OF THE INVENTION

1. Field of the Invention

The invention relates to a photographing apparatus which is suitable for use in a video camera or the like using an inner focus type lens.

2. Related Background Art

In recent years, in association with the realization of a small size and a light weight of a video integrated type camera, a volume and a weight of a lens section and an automatic focus adjusting section which occupy in the whole camera are rapidly being reduced. With respect to the latter automatic focus adjusting section, it is changed from the active type having a light projecting-/receiving apparatus of infrared rays to the passive type to find out an in-focus point from a video signal derived through an image pickup signal without using such a light projecting/receiving apparatus.

On the other hand, with respect to the former lens section, there is frequently used what is called an inner focus type lens such that a focus adjusting function is also commonly provided for a lens to correct the movement of a focal plane by a variable magnification and, further, a front lens is fixed, thereby miniaturizing the lens section.

FIG. 1 shows an example of a construction of the above inner focus type lens. Reference numeral 101 denotes a fixed first lens group; 102 a second lens group (variable magnification lenses) to variably change a magnification; 103 an iris; 104 a fixed third lens group; 105 a fourth lens group (focus compensator lens) having both a function to correct the movement of a focal plane in association with the variable magnification and a focus adjusting function; and 106 an image pickup device.

FIG. 2 is a diagram of a characteristic curve showing the relation between the position (axis of abscissa) of the second lens group 102 which are moved to variably change the magnification and function as a zoom lens and the position (axis of ordinate) of the fourth lens group 105 which function as a focus lens in order to focus to the distance of each object to be photographed. The object distance is shown as a parameter. When the focal distance doesn't change, namely, when the second lens group 102 is stopped, the fourth lens group 105 moves in parallel with the axis of ordinate on the relevant focal distance, for instance, A—A' in FIG. 2, thereby performing the focus adjustment. During the zooming operation, namely, when the second lens group 102 is moving, a locus of the fourth lens group 105 is selected from FIG. 2 in accordance with each object distance and the fourth lens group 105 is driven and controlled in accordance with the selected locus in correspondence to a change in focal distance. Due to this, by providing both of the correcting function of the focal plane due to the variable magnification and the focus adjusting function for the fourth lens group 105, a video image without a blur can be also obtained even during the zooming operation.

FIG. 3 is a characteristic diagram for explaining an example of a drive control method of the fourth lens group 105, particularly, during the zooming operation. A method of setting the coordinates is similar to that in FIG. 2. However, in the control, the moving area of each of the zoom lens and the focus lens is divided into a plurality of zones as shown in FIG. 3 and the control is executed on a zone unit basis. Each arrow whose angle sequentially changes in FIG. 3 indicates a moving speed of the fourth lens group 105. In FIG. 3, a moving area (axis of abscissa) of the second lens group 102 is divided into equal sixteen areas. Each of the 16 equal areas is now called a "zoom zone".

The curve in FIG. 2 is divided every zoom zone. In this instance, the curve can be divided into the portions having almost the same gradient in each zoom zone. When the zoom speed is constant, so long as the gradients are equal, even if the object distances are different, the moving speeds of the fourth lens group 105 can be equalized. Therefore, as shown in FIG. 3, the axis of ordinate is divided into portions I, II, . . . having the same gradient every zoom zone and one representative speed is given, respectively.

With the above method, if the lens system is set into the in-focus state at the start of the zooming operation and the zooming operation is executed while detecting the positions of the zoom lens and focus lens, it is possible to always track the locus in FIG. 2 at the proper moving speed of the fourth lens group 105.

The moving speed information of the focus lens as described in FIG. 3 is obtained only when the moving speed of the zoom lens is fixed to a certain value (referred to as $V_{zs}$). This is because the locus in FIG. 2 shows the position (axis of ordinate) of the focus lens to the position (axis of abscissa) of the zoom lens. To obtain the focus lens speed information to trace the locus, the moving speed of the zoom lens must be inevitably defined.

Therefore, for instance, assuming that an actuator of the zoom lens is constructed by a DC motor, the driving speed of DC motor fluctuates due to a difference of the position of the camera, a variation in torque of the actuator itself, environment, a reduced voltage of battery, or the like. If the zooming operation is executed while ignoring such a fluctuation, the focus lens speed to the zoom speed defined as mentioned above isn't fitted to the actual zoom speed, so that a blur occurs during the zooming operation.

Therefore, hitherto, as shown in, for example, JP-A-1-319717, there is proposed a method whereby the zoom speed during the zooming operation is always measured and a ratio between the result of the measurement and the standard moving speed $V_{zs}$ is calculated and multiplied to the moving speed information in FIG. 3.

FIG. 4 is a flowchart for explaining a measuring method of the zoom speed in the above conventional method. S1 denotes a step to indicate the start of the execution of a program. S2 denotes a step to execute a program to discriminate whether a zoom switch (not shown) has been depressed or not; S3 a step to execute a program to increase a value of a zoom speed measuring counter provided in order to measure the zoom speed by "1", S4 a step to execute a program to discriminate whether the zoom lens lies within a zoom zone boundary in FIG. 3 or not; S5 a step to execute a program to discriminate whether a vertical sync signal has been supplied or not; S6 a step to execute a program to substitute a value of a zoom speed storing memory 2 into a zoom speed storing memory 3; S7 a step to execute a program to substitute a value of a zoom speed storing memory 1 into the memory 2 in a manner similar to step S6; and S8 a step to execute a program to similarly substitute a value of the counter into the memory 1. Each of the zoom speed storing memories 1 to 3 denotes a memory to store a time which is required when the zoom lens is moved from one boundary of a certain zoom zone to another boundary by the number of vertical sync signals. S9 denotes a step to execute a program to clear the counter; S10 a step to execute a program to perform the normal AF (automatic focusing) operation when the operating mode is not the zooming mode; and S11 a step to indicate the end of execution of the program.

In the above flowchart, when it is confirmed that the execution of the program has been started in step S1 and the zoom switch has been depressed in step S2, the counter value is increased by "1" in step S3. When the zoom lens is located at a position out of the boundary of the zoom zone in step S4, the system waits for the arrival of the vertical sync signal in step S5. When the vertical sync signal is supplied, the counter value is again increased by "1" in step S3. When it is detected in step S4 that the zoom lens lies within the boundary of the zoom zone, the processes in step S6 and subsequent steps are executed. At this time point, a vertical synchronization period which is required to pass one zone has been stored in the counter and is used as zoom speed information. In steps S6 to S8, each time the zoom lens passes one zoom zone, the data is shifted so as to store the zoom speed information of the past three zones into the memories 3 to 1. When the latest zoom speed information is stored into the memory 1 in step S8, the counter is reset in step S9 and a series of zoom speed measuring processes are finished. Since no data exists in the memories 2 and 3 at the starting time point of the measurement, three data cannot be used for a predetermined period of time just after the start of the measurement.

With respect to the zoom speed information stored in the three memories as mentioned above, for instance, by calculating the mean value of them or by using the maximum value, the zoom speed information can be accurately used while eliminating the non-linearity or noise components of an encoder output.

In the above conventional apparatus, as shown in FIG. 3, a phenomenon such that the gradient of the locus suddenly increases for the axis of abscissa, particularly, at a position near the edge of telephoto (tele. T) occurs. Namely, this means that the moving speed of the focus lens during the zooming operation rapidly rises at a position near the tele. edge. It is known that such a tendency becomes typical as the focal distance increases (as it approaches to the right in the diagram). It is, therefore, necessary to prepare an actuator such that as a zoom magnification increases, enough rotational torque is obtained while realizing a desired speed at a position near the tele. edge. However, generally, in the actuator, as the user wants to obtain a high rotational speed and a high rotational torque, the size and noises increase and an electric power consumption also increases. Namely, when the zoom magnification increases, not only a size of actuator is enlarged but also an electric power consumption increases in association with the large zoom magnification. Thus, a size of battery or the like which is attached to an article is also enlarged, thereby producing a result opposite to the foregoing requirements of a small size and a light weight.

Therefore, as means of solving the above drawbacks, there has been proposed a method whereby a movement amount per unit time of the zoom lens is reduced in a region (namely, near the tele. edge) in which the moving speed of the focus lens is high.

When the operator wants to reduce the movement amount per unit time of the zoom lens at a position near the tele. edge as in the conventional apparatus, there is a large possibility in which both of the data before and after the measurement mixedly exist for a little while just after the change of the zoom speed and an erroneous result is derived. Accordingly, when the moving speed of the focus lens is determined while keeping such a small movement amount, a problem such that a blur during the zooming operation is rather promoted occurs.

SUMMARY OF THE INVENTION

The invention is made to solve the above problems and it is the first object of the invention to provide a photographing apparatus which can control the movement of a focus lens without causing a blur during the zooming operation irrespective of the position of a zoom lens.

The second object of the invention is to provide a photographing apparatus in which in the case where a moving speed of a zoom lens is changed as a result of the measurement of the moving speed of the zoom lens, a control based on another method is performed without using information of the result of the measurement, thereby preventing a blur due to the unstable operations before and after the change of the speed.

The third object of the invention is to provide a photographing apparatus in which the operation to decide a moving speed of a focus lens is executed in a state in which the focus lens is substantially stopped or in a state in which the speed of the focus lens is extremely low, thereby preventing influences by a measurement error and a speed error.

To accomplish the above objects, according to a preferred embodiment of the invention, there is provided a photographing apparatus comprising a first lens group to variably change a magnification; a second lens group to perform a focus adjustment; movement measuring means for measuring a moving speed of the first lens group; movement control means for moving the second lens group at a moving speed according to a measured value of the moving speed which is obtained from the movement measuring means; and speed change means for changing the moving speed of the first lens group, wherein when the moving speed obtained from the movement measuring means is changed, the movement control means stops the movement control of the second lens group according to the measured value of the moving speed which is obtained from the movement measuring means.

Thus, it is possible to prevent that the moving speed of the first lens group in which the measurement data before and after the measurement easily mixedly exist is used as measurement data just after the change and, accordingly, the moving speed of the second lens group corresponding to such measurement data is not determined. Consequently, a blur during the zooming operation due to it can be prevented. Moreover, a proper lens control can be performed while maintaining a miniaturization of the lens without enlarging an actuator of the lens.

According to another preferred embodiment of the invention, there is provided a photographing apparatus comprising a first lens group to variably change a magnification; a second lens group to perform a focus adjustment; first detecting means for detecting a moving speed of the first lens group; second detecting means for detecting a moving speed of the second lens group; control means for controlling the moving speed of the second lens group in accordance with the moving speed of the first lens group detected; and speed change means for changing the moving speed of the first lens group, wherein when the second lens group is stopped or the moving speed thereof is enough low, the control means controls the speed change means so as to change the moving speed of the first lens group.

Still another object of the invention is to provide a photographing apparatus in which a lens barrel and an actuator for a focus lens can be miniaturized and reduced in weight and, in the case of changing a moving speed of a first lens group, a detection speed is not used, so that a focusing blur during the zooming operation in the case of increasing a zoom magnification can be prevented.

The above and other objects and features of the present invention will become apparent from the following detailed description and the appended claims with reference to the accompanying drawings.

BRIEF DESCRIPTION OF THE DRAWINGS

FIG. 7 is a characteristic diagram for explaining another embodiment of the invention.

DETAILED DESCRIPTION OF THE PREFERRED EMBODIMENTS

Embodiments of the invention will be described hereinbelow with reference to the drawings.

Figure 1:
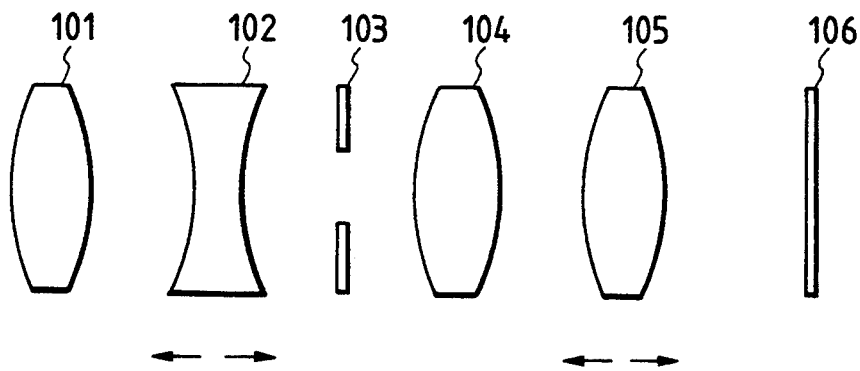
FIG. 1 is a constructional diagram showing an inner focusing type lens.
Figure 5:
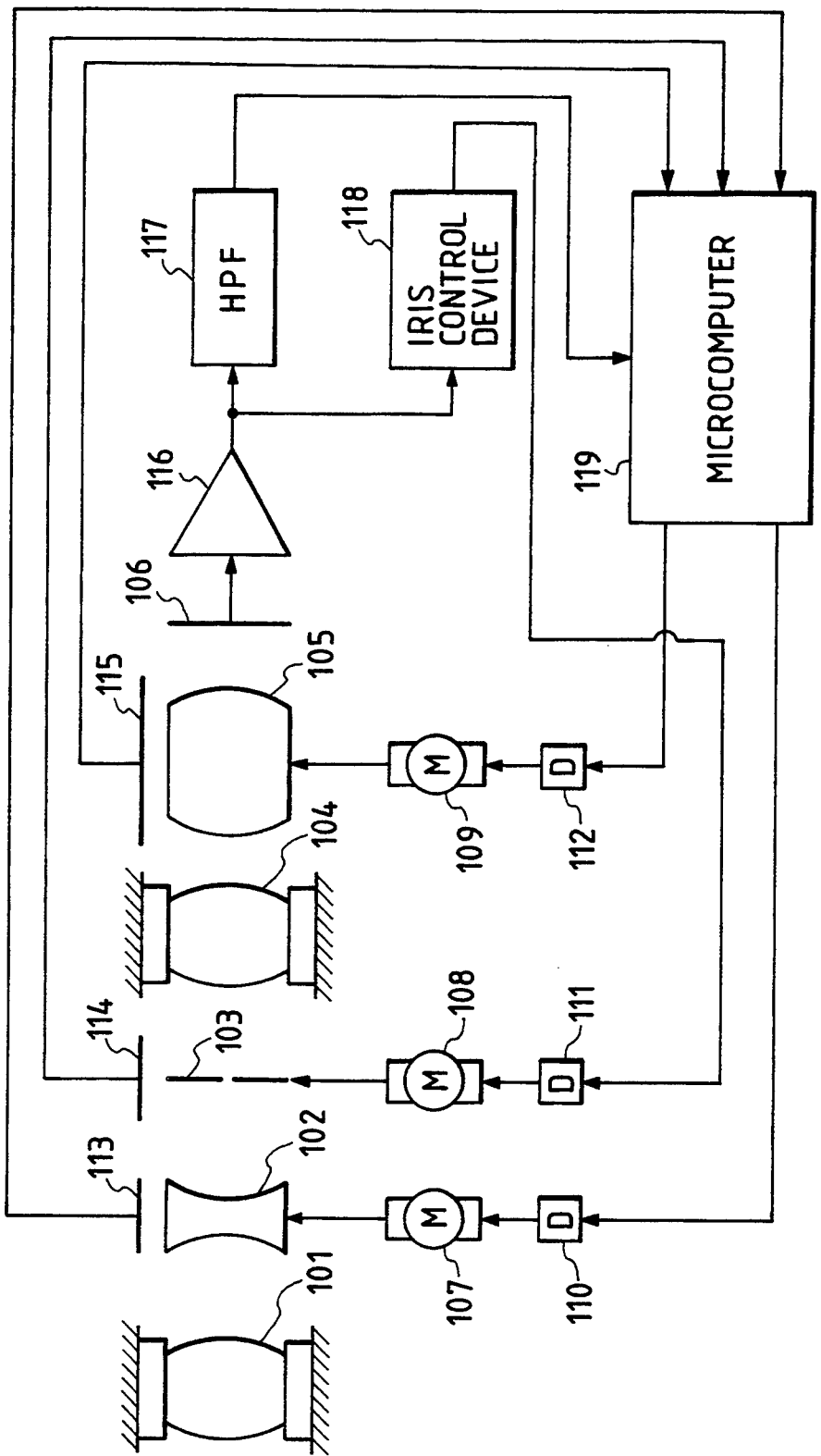
FIG. 5 is a block diagram showing an embodiment of a photographing apparatus according to the invention.

FIG. 5 is a constructional diagram showing an embodiment of a photographing apparatus of the invention. Reference numeral 101 denotes the fixed first lens group; 102 the second lens group to variably change a magnification; 103 the iris; 104 the fixed third lens group; 105 the fourth lens group having a function to correct the movement of a focal plane in association with the variable magnification and a focus adjusting function; and 106 the image pickup device. The above component elements have substantially the same construction as that of FIG. 1.

Reference numerals 107, 108, and 109 denote actuators to drive the first lens group 102, iris 103, and fourth lens group 105, respectively; 110, 111, and 112 drivers to generate energies for driving the actuators 107, 108, and 109 in response to drive commands, respectively; and 113, 114, and 115 encoders for detecting states of the first lens group 102, iris 103, and fourth lens group 105, namely, positions, movement amounts, and the like of them, for converting into electric signals, and for generating to a microcomputer 119, which will be explained hereinlater. Further, reference numeral 116 denotes an amplifier to amplify the image pickup signal generated from the image pickup device 106; 117 a high pass filter (HPF) to extract a high frequency component in the video signal which changes in accordance with the focusing state; and 118 an iris control device to adjust the iris 103 in accordance with an output (luminance level) of the amplifier 116 in a manner such that a light amount on the image pickup device 106 is set to a proper value. Practically speaking, the iris control device controls the iris so that the luminance level of the image pickup device is set to a predetermined value. Reference numeral 119 denotes a microcomputer (hereinafter, referred to as a "micom") to control the whole system.

Figure 3:
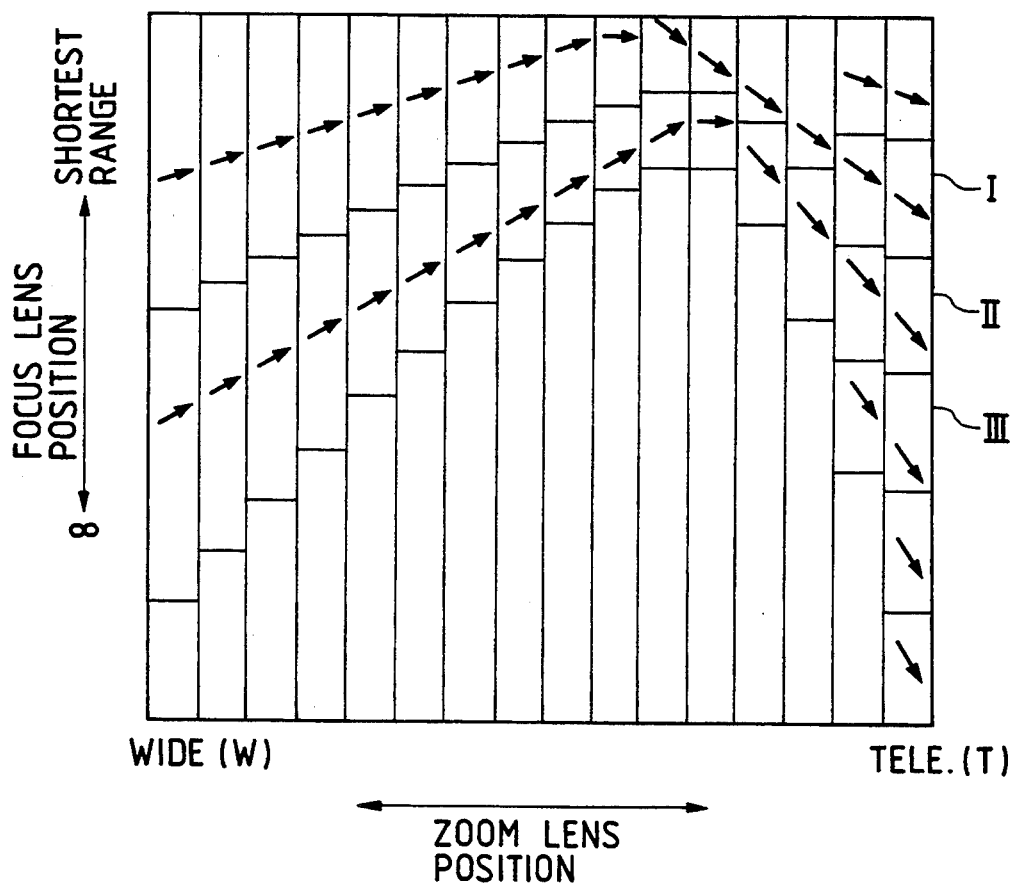
FIG. 3 is a diagram showing a table in which moving speed information of the focus lens corresponding to the zoom lens position and focus lens position has been stored.
Figure 2:
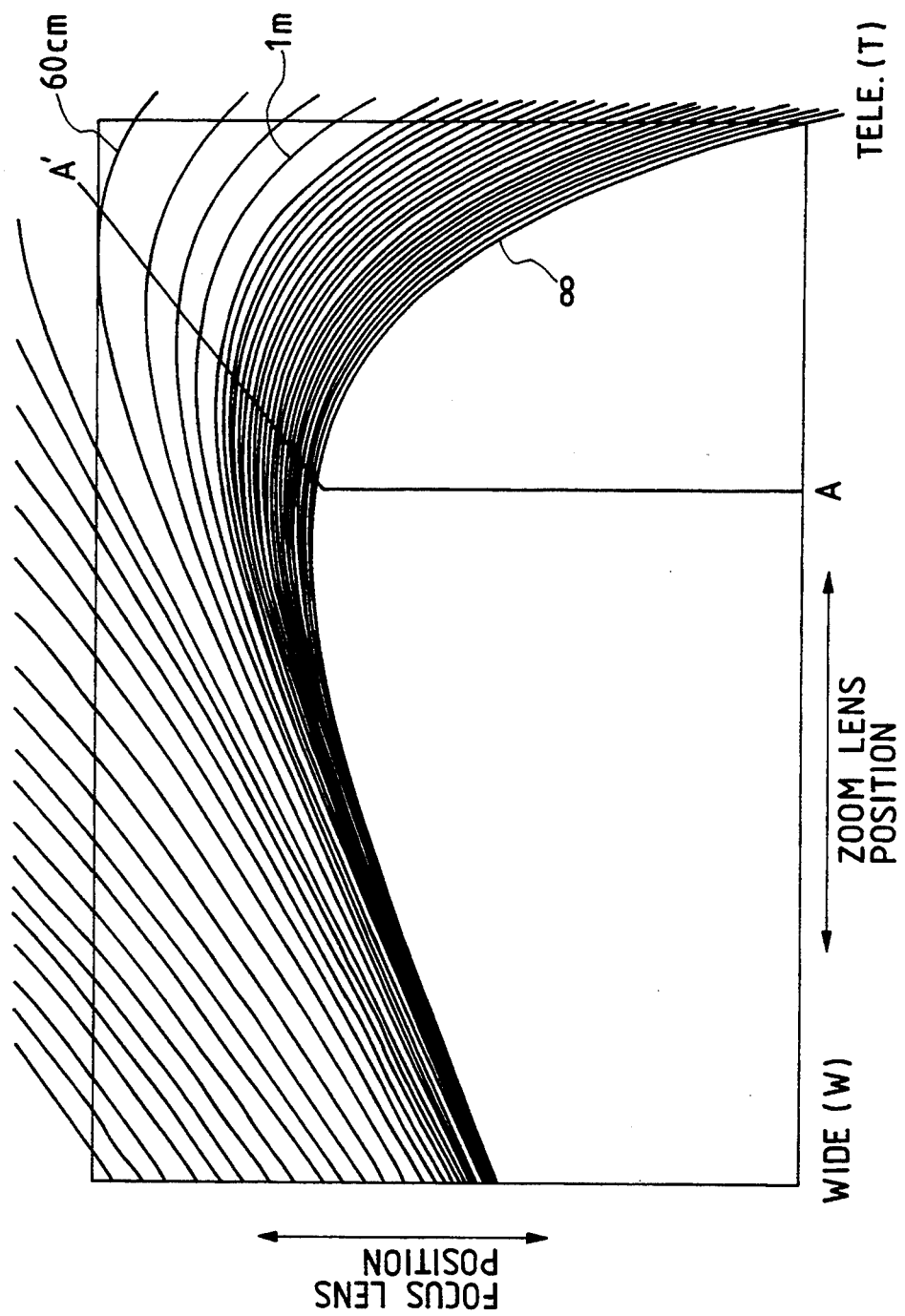
FIG. 2 is a characteristic diagram showing the relation between the zoom lens position and the focus lens position in the lens of the type shown in FIG. 1.

In the above construction, the control of the relation between the relative positions of the zoom lens and focus lens, namely, the tracing of the locus in FIG. 2 is performed by the micom 119. The speed information of each zoom zone in FIG. 3 has been stored as a table in the micom 119. The positions of the focus lens and zoom lens are detected by the encoders 115 and 113. A driving speed of the focus lens is determined with reference to the table on the basis of those position information.

Generally, in the lens system of the inner focusing type as a target of the invention, when the zoom magnification is raised while suppressing the size of lens barrel, as will be obviously understood from the locus of FIG. 2, the gradient on the tele. side suddenly increases. Therefore, to trace it with a high fidelity, the maximum speed at which the actuator of the focus lens can drive must be improved with an increase in zoom magnification. However, this results in an enlargement of the lens section, an increase in weight, and a high electric power consumption.

Figure 4:
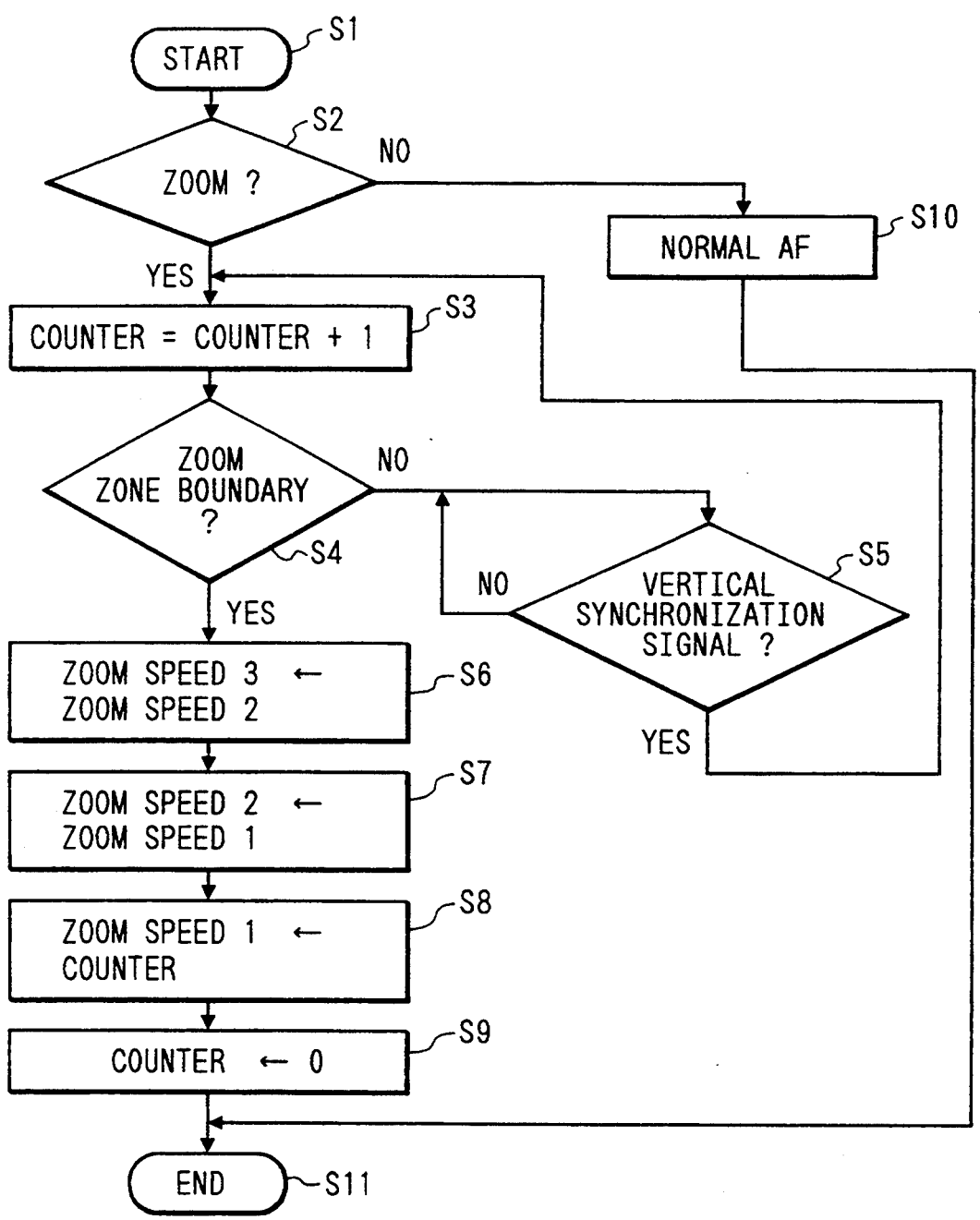
FIG. 4 is a flowchart showing an algorithm to measure a moving speed of the zoom lens.
Figure 6:
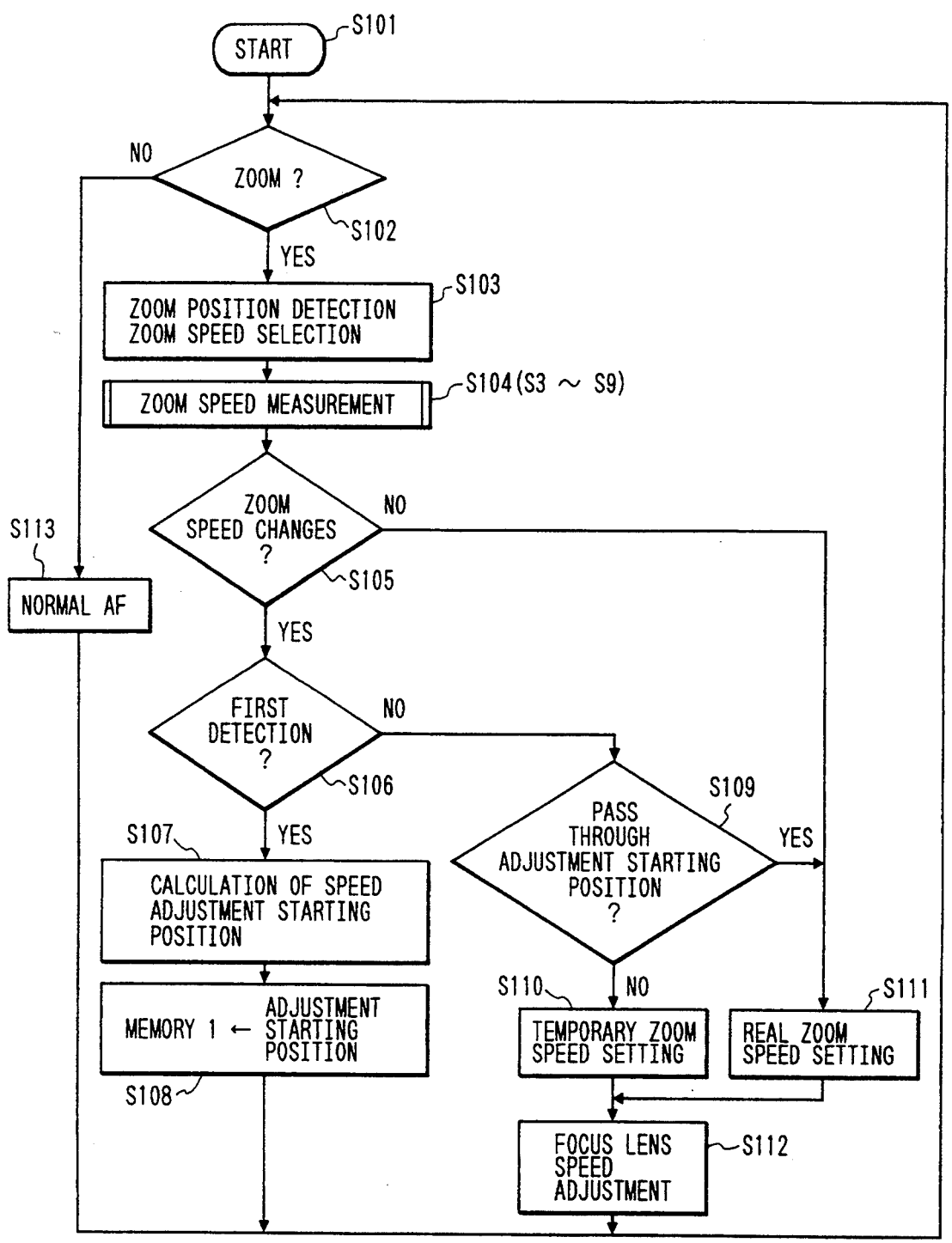
FIG. 6 is a flowchart showing a control algorithm of the invention.

FIG. 6 is a flowchart for explaining the control operation according to the program in the micom 119 according to the embodiment. In FIG. 6, S101 denotes a step to indicate the start of execution of the program; S102 a step to execute a program to discriminate whether the zoom switch (not shown) has been depressed or not; S103 a step to execute a program for detecting the position of the second lens group 102 by an output value of the encoder 113, for discriminating from this value whether the second lens group 102 exists in which zoom zone in FIG. 3, and for reducing the zoom moving speed when the zoom lens exists in a decelerating region, which will be explained hereinlater; and S104 a step to execute a program to measure the zoom speed shown in FIG. 4 and to perform the operations until the number of vertical sync signals is counted in the case where the second lens group passes one zoom zone (steps S3 and S5) and the speed information of the past three zoom zones is stored into the first to third zoom speed storing memories 1 to 3 (steps S6 to S8) and a zoom speed measuring counter is reset when the latest speed information is stored into the memory 1 (step S9). S105 denotes a step to execute a program to discriminate whether the second lens group 102 lies within the decelerating region or not. S106 denotes a step to execute a program to discriminate whether the change in zoom moving speed has been detected in one zooming operation for the first time or not.

S107 denotes a step to execute a program to calculate whether the measurement of the speed of the zoom lens can be started or not when the zoom lens enters either one of the zoom zones as a result of step S103; S108 a step to execute a program to store the result of the calculation in step S107 into the memory; S109 a step to execute a program to discriminate whether the zoom lens has passed the position stored in step S108 or not; S110 a step to execute a program for setting a prepared temporary zoom speed and for using the temporary zoom speed for the adjustment of the moving speed of the focus lens; and S111 a step to execute a program to use the result of step S104 for the speed adjustment of the focus lens. Further, S112 denotes a step to execute a program for receiving the result of step S110 or S111 and for deciding the moving speed of the focusing lens during the zooming operation. S113 denotes a step to execute a program to execute the normal AF operation when the zoom switch is not depressed.

The operation of the embodiment will now be described with reference to the flowchart of FIG. 6.

First, when the execution of the program is started in step S101, a check is made in step S102 to see if the zoom switch has been depressed or not. If NO, the normal AF operation is executed in step S113. If YES, the zoom zone in which the zoom lens exists is detected in step S103. Further, the zoom speed is measured in step S104 as mentioned above. When the zoom lens is being decelerated in step S105, step S106 follows. When the zoom lens is set to a normal speed, processes in steps S111 and S112 are executed.

The decelerating region in step S104 will now be described. In FIG. 2, the gradient of the locus is steep on the tele. side (right side in the diagram) than the boundary A—A'. In this portion, a movement amount of the focus lens is larger than a movement amount of the zoom lens. Therefore, when the moving speed of the zoom lens is constant, the actuator of the focus lens must be driven at a high speed on the tele. side than the boundary A—A'. Since the driving speed of the focus lens which traces the locus depends on the moving speed of the zoom lens, by reducing the driving speed of the zoom lens on the tele. side than the boundary A—A', the moving speed of the focus lens can be suppressed to a low speed. In the embodiment, accordingly, the decelerating region in step S104 is set to the tele. side than the boundary A—A' in the diagram and, when the zoom zone obtained as a result of step S103 lies within such a decelerating region, the zoom moving speed is reduced, thereby decreasing the moving speed of the focus lens.

When a change in zoom speed is detected in step S105, a check is made in step S106 to see if such a change has been detected for the first time in a series of zooming operations or not. If YES, a zone to start the use of the result of the measurement of the zoom speed in step S104 is calculated in step S107. The result of the calculation is stored in step S108. After completion of the execution of step S108, the processing routine is returned to step S102. From the second time, the process in step S109 is executed through step S106. When it is determined in step S109 that the zoom lens lies within the use start zone, a process in step S111 is executed. When it is discriminated in step S109 that the zoom lens doesn't reach the adjustment starting position yet, the prepared temporary zoom speed is set in step S110. The moving speed of the focus lens is determined in step S112 on the basis of the temporary zoom speed.

Since the moving speed of the focus lens group 105 is set on the basis of the moving speed of the focus lens, even when the speed of the zoom lens group 102 is changed, such a speed change can be reflected to the moving speed of the focus lens group 105.

As for the above temporary speed, for instance, the speed at a time point when the zooming operation is executed with a standard position difference is preset and is stored as a temporary speed.

By executing the processes in accordance with the flow as mentioned above, even when the zoom speed is changed, the result of the measurement of the zoom speed can be smoothly reflected to the moving speed of the focus lens. Thus, even when the zoom magnification is raised in the inner focusing type lens, a proper lens control can be executed while maintaining the miniaturization of the lens without enlarging the actuator of the focus lens.

The above embodiment has been described with respect to the case where a change point of the moving speed of the zoom lens has been predetermined. For instance, even in the case of a camera having a variable speed zoom function or the like, the processes can be similarly executed in accordance with the flowchart of FIG. 6.

A method of deciding the change point of the moving speed of the zoom lens will now be described as another embodiment of the invention. As described above, a ratio between the measurement result of the moving speed of the zoom lens and the standard moving speed ($V_{zs}$) of the zoom lens is calculated and multiplied to the moving speed of the focus lens which has previously been stored.

When the temporary zoom speed is used as in the above embodiment, since the correction is not executed during such a period of time, a possibility of the occurrence of the blur is high. Therefore, the change point A—A' of the zoom moving speed is not set to the driving limit of the rotational speed of the focus lens but is set to a position on a line which is formed by connecting the points at which the moving speed of the focus lens is almost 0 on the locus of the zoom lens and focus lens as shown in FIG. 7.

According to the embodiment as mentioned above, at a position where the moving speed of the focus lens is almost 0, even if a numerical value to be multiplied is any value, the result becomes 0. Therefore, the portion in which the measurement result of the temporary zoom lens moving speed is used can be set to a portion where the influence is smallest. A proper zooming operation can be executed while continuing a proper correction.

According to the construction of the invention, in the camera having the inner focusing type lens system, in the case where the zooming operation is executed while changing the zoom speed and the zoom speed is measured and the result of the measurement is used for the control of the moving speed of the focus lens, so long as the zoom speed is changed, the speed measurement result is not used until it becomes correct. Further, by setting the change point of the zoom speed in accordance with the driving speed of the focus lens, the drive control of the focus lens can be smoothly performed. Thus, the zoom magnification can be raised without enlarging the lens barrel and actuator and without deteriorating the AF performance upon zooming.

Even if the zoom speed is changed, the measurement result of the zoom speed can be smoothly reflected to the moving speed of the focus lens, so that even when the zoom magnification is increased, an effect similar to that mentioned above can be obtained.

Further, when the zoom speed is changed, the moving speed of the focus lens can be determined without interrupting the process when a series of control is executed.

According to the invention as mentioned above, there is provided the lens apparatus comprising the first lens group to variably change a magnification; the second lens group to perform a focus adjustment; the first detecting means for detecting a moving speed of the first lens group; the second detecting means for detecting the moving speed of the second lens group; the control means for controlling the moving speed of the second lens group in accordance with the moving speed of the first lens group detected; and the speed change means for changing the moving speed of the first lens group, wherein the lens apparatus has the means for controlling the speed change means so as to change the moving speed of the first lens group in the case where the second lens group is stopped or when its moving speed is enough small, so that the sizes and weights of the lens barrel and the actuator for the focus lens can be reduced and a blur of the focus during the zooming operation when the zoom magnification is increased can be prevented.

What is claimed is:

1. A photographing apparatus comprising:
    a first lens group to variably change a magnification;
    a second lens group to perform a focus adjustment;
    control means for controlling a moving speed of the second lens group according to a moving speed of said first lens group; and
    speed change means for changing the moving speed of the first lens group, wherein said control means suspends movement control of the second lens group in response to change of the moving speed of the first lens group.

2. An apparatus according to claim 1, wherein after the moving speed was changed, when said control means determines that a moving speed of said first lens group after the change is correct, the control means restarts the movement control of the second lens group according to the moving speed of said first lens group.

3. An apparatus according to claim 1, wherein for a period of time during which the movement of the second lens group is stopped, said control means executes the movement control of the second lens group by using a preset temporary moving speed.

4. An apparatus according to claim 1, wherein said speed change means decelerates the variable magnification lens at a predetermined position on the telephoto side.

5. An apparatus according to claim 3, wherein said first lens group is a zoom lens.

6. An apparatus according to claim 5, wherein said second lens group is a focus lens.

7. A photographing apparatus comprising:
    a first lens group to variably change a magnification;
    a second lens group to perform a focus adjustment;
    first detecting means for detecting a moving speed of said first lens group;
    second detecting means for detecting a moving speed of said second lens group;
    control means for controlling the moving speed of the second lens group in accordance with the moving speed of the first lens group detected; and
    speed change means for changing the moving speed of the first lens group, wherein said control means controls the speed change means so that the moving speed of the first lens group is changed in response to a detection of stopping of the second lens group or a large decrease of the moving speed of the second lens group by said second detecting means.

8. An apparatus according to claim 7, wherein said first lens group is a zoom lens and said second lens group is a focus lens.

9. An apparatus according to claim 8, wherein said control means changes the speed of the zoom lens in a region where the speed of the focus lens is equal to 0 or is small enough on the telephoto side of the zoom lens.

10. An apparatus according to claim 9, wherein said control means controls said speed change means so as to decelerate the zoom lens on the telephoto side.

11. An optical control apparatus, comprising:
    first optical means;
    second optical means for correcting optical change caused by movement of said first optical means;
    detection means for detecting an operation state of said first optical means; and
    control means for controlling said second optical means according to a result of detection by said detection means to correct the optical change, the control means using prestored predetermined control information instead of the result of detection to control said second optical means when a predetermined change of the operation state of said first optical means is detected by said detection means.

12. An apparatus according to claim 11, wherein said second optical means corrects change of an image forming position, caused by the movement of said first optical means.

13. An apparatus according to claim 12, wherein said control means includes storage means which stores a plurality of characteristic curves representative of relation between positions of the first and second optical means, and said control means selects a corresponding one of said plurality of characteristic curves on the basis of information as to positions of the first and second optical means and controls a relative position of the first and second optical means on the basis of the selected characteristic curve.

14. An apparatus according to claim 13, wherein said detection means detects a speed of said first optical means, and wherein said control means controls a speed of said second optical means on the basis of the result of detection by said detection means so that the relation between positions of the first and second optical means satisfies the selected characteristic curve.

15. An apparatus according to claim 14, wherein said detection means divides a movement range of said first optical means into a plurality of blocks and operates the speed of said first optical means by measuring time required by said first optical means to pass through the block.

16. An apparatus according to claim 15, wherein said control means controls the speed of said second optical means on the basis of said prestored control information stored in advance until a new measurement of speed is performed, when the speed of said first optical means changes.

17. An apparatus according to claim 16, wherein said first optical means is a magnification lens and said second optical means is a focus lens.

18. An apparatus according to claim 17, wherein said control information is a reference speed of said prestored magnification lens.

19. A video camera comprising:
a zoom lens;
a compensator lens for correcting change of an image forming position caused by movement of said zoom lens;
zoom speed control means for changing a speed of said zoom lens; and
control means for controlling said compensator lens according to the speed of said zoom lens, said control means using prestored predetermined control information instead of information relative to the speed of said zoom lens to control said compensator lens in the case that a predetermined change of the operation state of said zoom lens is caused by said zoom speed control means.

20. A video camera according to claim 19, wherein said compensator lens corrects the change of the image forming position caused by the movement of said zoom lens.

21. A video camera according to claim 20, wherein said control means includes storage means which stores a plurality of characteristic curves representative of a relation between positions of said zoom lens and said compensator lens, and said control means selects a corresponding one of said plurality of characteristic curves on the basis of information as to positions of said zoom lens and said compensator lens and controls a relative position of said zoom lens and said compensator lens on the basis of the selected characteristic curve.

22. A video camera according to claim 21, wherein said control means detects a speed of said zoom lens and controls a speed of said compensator lens on the basis of the result of detection so that the relation between positions of said zoom lens and said compensator lens satisfies the selected characteristic curve.

23. A video camera according to claim 22, wherein said control means divides a movement range of said zoom lens into a plurality of blocks and operates the speed of said zoom lens by measuring time required by said zoom lens to pass through the block.

24. A video camera according to claim 23, wherein said control means controls the speed of said compensator lens on the basis of said prestored control information until a new measurement of speed is performed when the speed of said zoom lens changes.

25. A camera apparatus comprising:
a zoom lens;
a compensator lens for correcting change of an image forming position caused by movement of said zoom lens;
zoom speed control means for changing a speed of said zoom lens; and
control means for controlling a follow-up speed of said compensator lens to said zoom lens by detecting the speed of said zoom lens, wherein said zoom speed control means changes the speed of said zoom lens at a position at which the follow-up speed of said compensator lens controlled by said control means becomes less than a predetermined value.

26. A camera apparatus according to claim 25, wherein said control means controls the speed of said compensator lens on the basis of said control information stored in advance, when the speed of said zoom lens is changed by said zoom speed control means.

27. A camera apparatus according to claim 26, wherein said control means includes storage means which stores a plurality of characteristic curves representative of a relation between positions of said zoom lens and said compensator lens, and said control means selects a corresponding one of said plurality of characteristic curves on the basis of information as to positions of said zoom lens and said compensator lens and controls a relative position of said zoom lens and said compensator lens on the basis of the selected characteristic curve.

28. A camera apparatus according to claim 27, wherein said control means detects a speed of said zoom lens and controls a speed of said compensator lens on the basis of the result of detection so that the relation between positions of said zoom lens and said compensator lens satisfies the selected characteristic curve.

29. A camera apparatus according to claim 28, wherein said control means controls the speed of said compensator lens on the basis of said control information stored in advance until a new measurement of speed is performed, when the speed of said zoom lens changes.

* * * * *

UNITED STATES PATENT AND TRADEMARK OFFICE
CERTIFICATE OF CORRECTION

PATENT NO. : 5,436,684
DATED : July 25, 1995
INVENTOR(S) : Masahide Hirasawa

It is certified that error appears in the above-indentified patent and that said Letters Patent is hereby corrected as shown below:

Col. 10, line 63. Delete "stored in advance".

Signed and Sealed this

Fifth Day of December, 1995

*Attest:*

BRUCE LEHMAN

*Attesting Officer*     *Commissioner of Patents and Trademarks*